United States Patent [19]

Gurtler

[11] 4,173,123
[45] Nov. 6, 1979

[54] OPTICALLY DRIVEN SOLAR ENGINE
[75] Inventor: Richard W. Gurtler, Mesa, Ariz.
[73] Assignee: Motorola, Inc., Schaumburg, Ill.
[21] Appl. No.: 814,232
[22] Filed: Jul. 8, 1977

Related U.S. Application Data
[63] Continuation-in-part of Ser. No. 705,842, Jul. 16, 1976, abandoned.

[51] Int. Cl.² ............................................. F03G 7/02
[52] U.S. Cl. ....................................... 60/641; 60/531
[58] Field of Search ................. 60/508, 509, 511, 516, 60/514, 530, 531, 641, 698, 716, 720

[56] References Cited
U.S. PATENT DOCUMENTS

| 1,068,881 | 7/1913 | Fortoul | 60/530 |
| 1,178,653 | 4/1916 | Levering | 60/531 |
| 3,117,414 | 1/1964 | Daniels et al. | 126/270 X |
| 3,256,686 | 6/1966 | Lindberg | 60/516 |

Primary Examiner—Allen M. Ostrager
Assistant Examiner—Stephen F. Husar
Attorney, Agent, or Firm—John A. Fisher

[57] ABSTRACT

A solar engine having a plurality of elements which convert solar energy to usable mechanical motion, such as a piston and a thermally expandable fluid in a cylinder. The sun's rays are focused on a movable mirror which is provided to selectively direct the thermal energy to each of the piston and cylinder thermal energy converting elements. The thermal energy causes expansion of the fluid in the selected cylinder, thus moving the piston to provide mechanical motion. The thermodynamic cycle employed can be selected by the proper choice of the movable mirror timing and by the construction of the piston driven elements of the engine. The result is an efficient, flexible solar engine in which intermediate storage of thermal energy from the sun is not necessary.

4 Claims, 6 Drawing Figures

OPTICALLY DRIVEN SOLAR ENGINE

RELATED APPLICATIONS

This is a continuation-in-Part of application Ser. No. 705,842 filed July 16, 1976 and now abandoned.

BACKGROUND OF THE INVENTION

This invention relates to a solar engine in which thermal energy from the sun is converted directly to mechanical motion, without intermediate storage of the thermal energy. More particularly, it relates to such a solar engine in which rays of the sun are concentrated and successively directed to a plurality of elements which convert energy from the concentrated rays to mechanical motion.

There has long been theoretical interest in engines which take the thermal energy required for their operation from the sun's rays. Heat engines offer a means for direct utilization of the energy of the sun since the sun's radiant energy can be focused onto a boiler or other light absorbing element to provide the heat source for the engine. For example, on a large scale, mirrors could be used to focus the energy on a boiler for a turbine system. Such a system, however, requires the transmission of heat from a collecting device into an expansion chamber. Heat will invariably by lost during such a transfer with a resultant decrease in working fluid temperature. Since engine efficiency increases with fluid operating temperature, any such decrease in fluid temperature will result in lower engine efficiency.

One solution to the problem of energy loss during heat transfer is to effect the heat collection within the work space of the engine by utilizing transparent walls or cylinder heads and incorporating an absorbing element within the work space. High temperatures and minimum energy loss can be obtained in this manner since the transparent wall and work space can be well insulated, the radiation can be sharply focused on a small work space, and efficient absorbing structures can be utilized. One such thermal engine has been described in U.S. Pat. No. 3,117,414.

One major drawback of many thermal engines, including the solar engine just described, is the inability to efficiently utilize the energy available from the heat source. This is especially true with cyclical engines which require that the energy be applied at the proper instant of the cycle and for the proper duration of the cycle with little waste of energy during those portions of the cycle not requiring heat input. For example, the Carnot cycle demands that heat be extracted from the heat source only during the isothermal expansion portion of the cycle; no heat is extracted from the source during the subsequent adiabatic expansion, isothermal compression or adiabatic compression portions completing the cycle. Achieving this cyclical interrupted heat flow is difficult and inefficient if the heat resides in a fluid. A means of achieving heat transfer from the heat source to the working fluid during only a portion of the cycle requires some transfer of working fluid or heat source fluid which must be controlled by valves or other mechanical means. Such controls can themselves have substantial energy requirements, thus detracting from overall engine efficiency.

SUMMARY OF THE INVENTION

Accordingly, it is an object of this invention to provide a solar engine in which rays of the sun are used directly to provide energy to the engine, without intermediate storage.

It is a further object of the invention to provide a solar engine in which rays of the sun are successively directed to provide energy to a plurality of drive means.

It is a still further object of the invention to provide an engine having means by which a radiant energy source is used to supply heat in an efficient and flexible manner thereby making possible a variety of thermodynamic engine cycles. Specifically, an engine is provided in which the radiant energy source is always utilized, except for an arbitrarily short portion of the cycle, during an isothermal power stroke.

The attainment of these and related objects may be achieved through use of the thermally driven engine herein disclosed. The engine has a plurality of elements, such as cylinders and pistons, which convert thermal energy to mechanical motion. A source of thermal energy is provided, such as a lens or other means for concentrating the sun's rays. Means selectively directs the thermal energy so provided to each of the plurality of thermal energy converting elements. For example, the thermal energy may be so selectively directed by means of a movable reflecting surface. With such an engine, there is no need to store the heat energy (and thereby degrade the quality of heat) represented by the concentrated sun's rays, and it is used directly to produce the mechanical motion.

The attainment of the foregoing and related objects, advantages and features of the invention should be more readily apparent after review of the following more detailed description of the invention, taken in conjunction with the drawings, in which:

DETAILED DESCRIPTION OF THE INVENTION

Figures 1, 2, 3:
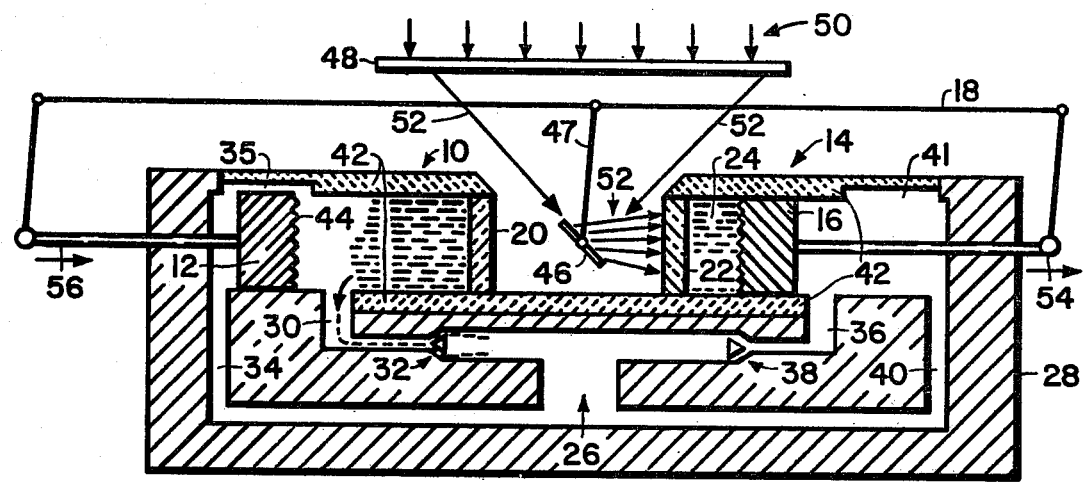
FIG. 1 represents a cross section of an embodiment of the invention.
FIG. 2 represents in perspective view one means for interconnecting the pistons and the mirror moving mechanism.
FIG. 3 shows in side view the mirror moving mechanism and the mechanical output means.

Turning now to the drawings, and more particularly to FIG. 1, the elements of a solar engine in accordance with the invention are shown. FIG. 1 shows a first cylinder 10 having a first piston 12 mounted therein for reciprocal motion. A second cylinder 14 and a second piston 16 are provided in the same manner. The two pistons are coupled together by means of a mechanical linkage, indicated schematically at 18 and shown in more detail in FIG. 2. Quartz windows 20 and 22 form the heads of the first and second cylinders 10 and 14, respectively. A thermally expandable fluid 24 is provided in each cylinder. The fluid may be air or another fluid having a high coefficient of thermal expansion, such as fluorinated hydrocarbons, either gaseous or liquid, or the like. A fluid cooling chamber 26 is located within block 28. The cooling chamber may be cooled passively through transfer to the atmosphere or actively, if desired, by contact to a cooling fluid such as water. The first cylinder 10 is connected to fluid cooling chamber 26 by means of exhaust passage 30 and one way valve 32, as well as by passage 34. Similarly, second cylinder 14 is connected to the chamber 26 by means of exhaust passage 36 and one way valve 38, as well as by passage 40. The block 28 is fabricated of a high heat conductivity metal. The walls 42 of the first and second cylinders 10 and 14 are fabricated of a low heat conductivity material, such as ceramic or the like. The piston head surfaces 44 are dark and roughened in order to minimize reflection of light striking them out of the cylinders 10 and 14. Inlet passages 35 and 41 are provided for cylinders 10 and 14 respectively.

Mirror 46 is pivotally mounted in the space between the first cylinder head 20 and the second cylinder head 22 and is connected to linkage 18 by linkage 47. A Fresnel lens 48 or the like is mounted above the block 28 so that its point of focus is near the mirror 46.

In operation, rays 50 from the sun are concentrated by the lens 48 to produce a concentrated beam indicated by the arrows 52. Typically, a Fresnel lens having an area of about 1 square meter will produce a focused beam 52 having an area of about 1-2 square centimeters near the pivotable mirror 46. With the second piston 16 in the position shown, mirror 46 is pivoted by means of linkage 47 to direct the concentrated beam 52 through quartz window 22 into second cylinder 14. Assuming a lens 48 of 1 square meter, and a mirror of from 1-2 square centimeters in area, the cylinder 14 may have a diameter of about 2 centimeters.

The concentrated beam 52 heats the thermally expandable fluid 24 in cylinder 14, causing the fluid to expand and drive piston 16 to the right, as indicated by the arrow near piston rod 54. While piston 16 moves to the right, piston 12 also moves to the right as indicated by the arrow near the piston rod 56, through the operation of linkage 18. Piston 16 continues to move to the right until it passes passage 36, thus allowing the expanded fluid 24 to exert pressure on one way valve 38, opening it, and allowing the expanded fluid 24 to pass into cooling chamber 26. Some pressure from the fluid 24 is also transmitted via passage 34 to piston 12, thus aiding its motion to the right to complete its compression stroke.

When piston 12 completes its compression stroke, mirror 46 is rapidly flipped by means of linkage 47 through a 90° angle in order to direct the concentrated beam 52 into cylinder 10. The above cycle is then repeated. At the time piston 12 begins to undergo its power stroke, the fluid pressure in cylinder 14 equalizes with the cooled fluid in chamber 26 by means of passage 40 and inlet passage 41. Both inlet passage 41 and exhaust passage 36 should be blocked by piston 16 at the time cylinder 10 undergoes its exhaust cycle through passage 30, in order for the exhaust from cylinder 10 to aid in compressing fluid 24 in cylinder 14.

It should be noted that operation of the invention in this manner achieves the goal of introducing the radiant heat only during the expansion (power) portion of the cycle and can approximate can ideal isothermal expansion by properly matching the output stroke velocity to the solar input flux. Furthermore, by using insulating walls and by redirecting the radiant flux during the compression portion of the cycle, the desired adiabatic compression cycle can be achieved. In the particular embodiment described here, the heat rejection is achieved by rapid exhaust of the heated fluid into the cooling chamber 26. There are, of course, a variety of other cycles and combinations that could be employed which will be familiar to those skilled in the art.

Turning now to FIG. 2, one possible means of achieving the rapid deflection of the beam will now be presented. In FIg. 2, the mirror 46 is mounted rigidly to a shaft 47A which passes through and is supported by the block 28. The extremities of shaft 47A then pass through slot 11 in the linkage 18. As the linkage 18 is translated by the movement of the piston rod 56, for example, the pin 13 mounted in the frame 18 will strike the shaped member 19 which is attached to the end of shaft 47A and will cause an abrupt 90° rotation of the shaft end of the mirror. The extended portions of the member 19 will be confined by the pins 13 as indicated in FIG. 3 which shows the shaped member 19 after it has been rotated through 90 degrees. An exactly similar but reverse process occurs when the piston rod 54 acts to move the linkage 18 to the right. Then the pin 13' will strike the shaped member 19' and cause the mirror 46 to rotate through 90 degrees in the opposite direction. Note that the location of the pins 13 and 13' on the linkage 18 determines the instant within the engine cycle at which the radiant energy source is switched from one piston to the other. The location of the pins and thus the timing of the cycle are entirely variable. This, in turn, allows variances in the thermodynamic cycle chosen. The mirror and mirror linkage assembly can be so constructed as to provide a rapid mirror movement while at the same time requiring a minimal amount of energy for its operation. The mirror 46, for example, might be constructed of a highly reflecting rigid metal foil which need be only about 10 mils in thickness. The additional members of the linkage assembly can similarly be constructed of extremely lightweight, reliable materials.

FIG. 3 also shows one possible means for converting the reciprocating motion of the engine to rotary motion which is amenable to useful work output. A conventional crankshaft 15, driven by the piston rod 54, in turn drives a flywheel 17.

In order to promote efficient operation, the Fresnel lens 48 should be movable to follow the sun's apparent path of travel across the sky. This can be done by pivoting the lens 48 separately, or if desired, by pivoting the entire engine. A number of planetary mechanisms are available to provide such movement.

Figure 4:
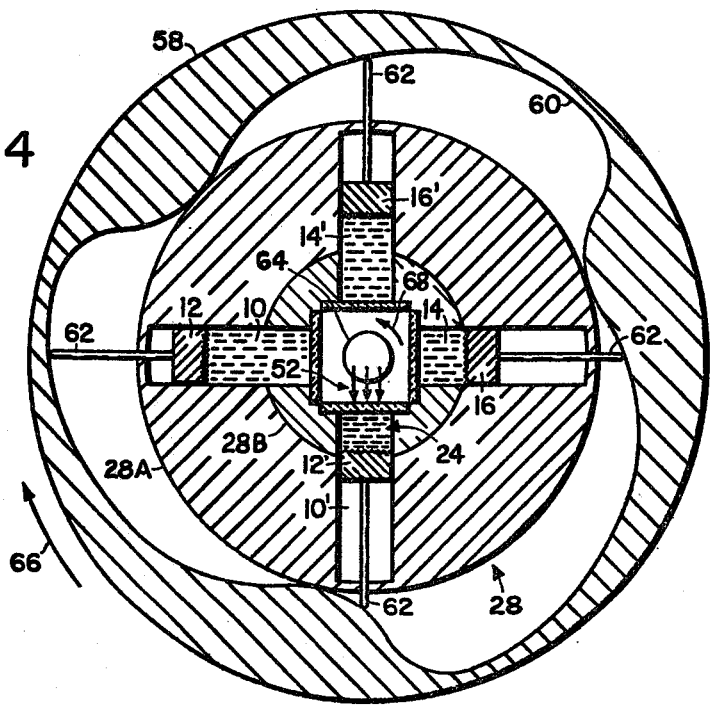
FIG. 4 is a top view of another embodiment of the invention.

Turning now to FIG. 4, there is shown a representation of how an engine in accordance with this invention can be used to impart rotary motion to a shaft. As shown, in addition to opposed first and second cylinders 10 and 14 and first and second pistons 12 and 16 as in FIG. 1, an additional pair of opposed cylinders 10' and 14' with pistons 12' and 16' are provided in the block 28 at a 90° angle to the first pair of opposed cylinders and pistons. A circular flywheel 58 is disposed around the cylinders and pistons. The interior surface 60 of the flywheel 58 is configured as shown to provide a camming surface. Piston rods 62 are disposed between each piston and the camming surface 60, as shown. In this embodiment, mirror 64 is positioned at a 45° angle with respect to the cylindrical axis of the motor and it is rotated to direct the concentrated beam 52 to each of the cylinders in succession.

In the position shown, the concentrated beam 52 is being directed into cylinder 10', thus heating the expandable fluid 24 to push piston 12' outward. This causes the piston rod 62 connected to piston 12' to push against surface 60 of the flywheel 58, causing the flywheel to rotate as indicated by arrow 66. In order to drive the flywheel 58 in a clockwise direction as indicated by arrow 66, rotating mirror 64 moves in a counter clockwise direction, as indicated by arrow 68. Thus, the next cylinder into which the beam 52 would be directed in the operation of the engine would by cylinder 14. In this manner, continuous rotation of the flywheel 58 in a clockwise direction is obtained. Note that there are two important variables that can be changed to give a variety of power/compression cycles. These variables are the shape of the camming surface 60, and the relative timing between the rotations of the flywheel and the mirror.

Figure 5:
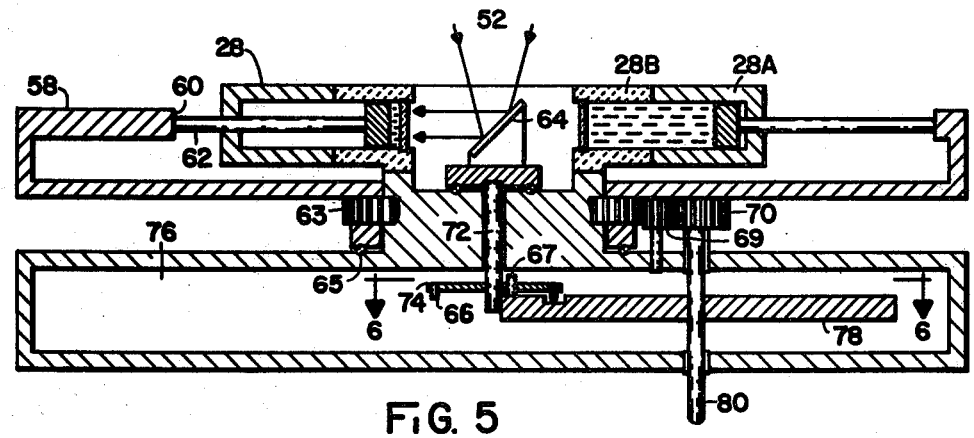
FIG. 5 is a cross-sectional view of the alternate embodiment of the invention showing the mirror timing means and the mechanical output means.

In the embodiment shown in FIG. 4, a closed cycle has been shown although other cycles could also be employed which could include inlet and exhaust parts which, for example, could operate in conjunction with the flywheel 58 which might expose inlet and exhaust holes in the interface between the flywheel and cylinder surfaces in region 65 indicated in the cross sectional view of FIG. 5. In the present configuration, interior region 28B of the block 28 is to be constructed of a low thermoconductive material so as to achieve adiabatic compression and subsequent isothermal expansion during the power input phase. The outer portion 28A of the block 28 is composed of a high thermoconductivity portion so as to easily reject the heat to the ambient through either active or passive cooling methods.

Figure 6:
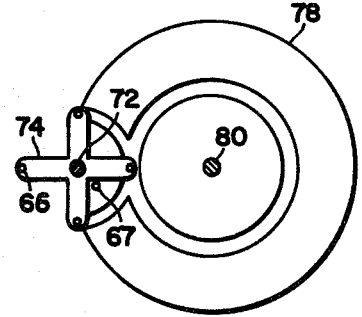
FIG. 6 represents the Geneva mechanism used for moving the mirror.

FIG. 5 shows in greater detail an embodiment of a mirror linkage system and an output power means. The flywheel 58 with an associated gear 63 is mounted on a supporting bearing structure 65 at the base of the block 28. Two additional gears 69, 70 mesh with gear 63 to drive the timing gear shaft 80. The gears 69, 70 are so chosen to provide shaft 80 with a rotational speed which is four times greater than that of the flywheel. This arrangement serves to properly synchronize the rotation of mirror and flywheel, to rotate the mirror in a proper direction, and also to better match the rotational speed of the output shaft 80 to the anticipated slow rotational speed of the flywheel. The mirror 64 is rigidly attached to a shaft 72 which also supports a first timing member 74 within the flywheel/mirror coupling chamber 76. A second timing member 78 is attached to the output shaft 80 and interacts with the first timing member 74 to rotate the mirror 64 by 90 degrees for each rotation of the second timing member 78. The timing members 74 and 78, which are more clearly shown in FIG. 6, comprise a conventional Geneva mechanism, the operation of which is well known in the art. The output shaft 80, rotating at four times the speed of the flywheel, is directly available as an output means for the engine.

It should now be apparent that a heat engine which may be powered by solar energy and which is capable of achieving the stated objects of the invention has been provided. Heat energy from concentrated light rays from the sun is used directly to expand a thermally expandable fluid, thus providing mechanical motion without the need for intermediate storage of the energy obtained from the sun. The solar engine of this invention is potentially more efficient than solar engines requiring such intermediate storage, is of simplified construction, and has a flexibility of design.

It should further be apparent to the art skilled that various changes in form and detail of the invention may be made. It is intended that such modifications within the spirit and scope of the claims appended hereto be covered thereby.

What is claimed is:
1. An optically driven solar engine, comprising:
 (a) a plurality of elements which convert solar energy to mechanical motion, each of said elements comprising a cylinder, a piston operatively disposed in said cylinder, and a thermally expandable fluid in said cylinder, said cylinder having a transparent head which allows solar energy to be transmitted into said cylinder;
 (b) means for focusing the sun's rays;
 (c) a reflective surface, movable to selectively reflect said focused rays into said cylinders; and
 (d) fluid flow passages interconnecting said cylinders, said passages capable of transmitting said thermally expandable fluid from one of said cylinders to another of said cylinders.
2. An optically driven solar engine, comprising:
 (a) a plurality of elements which convert solar energy to mechanical motion, each of said elements comprising a cylinder, a piston operatively disposed in said cylinder, and a thermally expandable fluid in said cylinder, said cylinder having a transparent head which allows solar energy to be transmitted into said cylinder;
 (b) means for focusing the sun's rays;
 (c) a reflective surface, movable to selectively reflect said focused rays into said cylinders; and
 (d) means for timing the motion of said reflective surface to select one of a variety of thermodynamic cycles.
3. A solar driven engine, which comprises:
 (a) a plurality of cylinders with transparent heads,
 (b) a piston operatively disposed in each of said cylinders,
 (c) a thermally expandable fluid in each of said cylinders between said cylinder head and said piston,
 (d) means for focusing rays from the sun,
 (e) a reflective surface positioned in the path of said focused rays, movable to direct the focused rays selectively to each of said plurality of cylinders, said cylinders being positioned around said reflective surface with their transparent heads pointed toward said reflective surface, and
 (f) a rotatable member having a cammed inner surface and capable of rotating when acted upon by said pistons.
4. The solar driven engine of claim 3 wherein said cammed inner surface is shaped to provide a desired thermodynamic cycle.

* * * * *